United States Patent
Tranninger

(10) Patent No.: US 8,816,010 B2
(45) Date of Patent: Aug. 26, 2014

(54) AUTOMOTIVE MATERIAL WITH EXCELLENT FLOW, HIGH STIFFNESS, EXCELLENT DUCTILITY AND LOW CLTE

(75) Inventor: Michael Tranninger, Pucking (AT)

(73) Assignee: Borealis AG, Vienna (AT)

(*) Notice: Subject to any disclaimer, the term of this patent is extended or adjusted under 35 U.S.C. 154(b) by 0 days.

(21) Appl. No.: 13/376,717

(22) PCT Filed: May 28, 2010

(86) PCT No.: PCT/EP2010/057421
§ 371 (c)(1),
(2), (4) Date: Jan. 18, 2012

(87) PCT Pub. No.: WO2010/142540
PCT Pub. Date: Dec. 16, 2010

(65) Prior Publication Data
US 2012/0108728 A1 May 3, 2012

(30) Foreign Application Priority Data
Jun. 9, 2009 (EP) .................................. 09162277

(51) Int. Cl.
*C08L 23/16* (2006.01)
(52) U.S. Cl.
CPC ..................................... *C08L 23/16* (2013.01)
USPC ............................. 525/240; 524/451; 524/500
(58) Field of Classification Search
CPC ........................................................ C08L 23/16
USPC .................................. 524/451, 500; 525/240
See application file for complete search history.

(56) References Cited

U.S. PATENT DOCUMENTS

2005/0234198 A1  10/2005  Tian et al.

FOREIGN PATENT DOCUMENTS

| EP | 1354901 A1 | * | 10/2003 |
| EP | 1 477 525 A | | 11/2004 |
| EP | 1477525 A1 | * | 11/2004 |
| EP | 2 036 947 A | | 3/2009 |
| EP | 2036947 A1 | * | 3/2009 |
| EP | 2 055 739 A | | 5/2009 |
| EP | 2075284 A1 | * | 7/2009 |
| WO | 2005123827 A1 | | 12/2005 |
| WO | 2007002435 A1 | | 1/2007 |

OTHER PUBLICATIONS

Chinese Office Action, Dated Dec. 5, 2012.

* cited by examiner

*Primary Examiner* — Susannah Chung
*Assistant Examiner* — Josephine Chang
(74) *Attorney, Agent, or Firm* — Tarolli, Sundheim, Covell & Tummino LLP

(57) ABSTRACT

Composition having a melt flow rate $MFR_2$ (230° C.) in the range of 10 to 50 g/10 min. said composition comprises two heterophasic polypropylenes comprising a propylene homopolymer matrix and an elastomeric copolymer, a plastomer and a mineral filler, wherein—said two heterophasic polypropylenes have different melt flow rates, —the first heterophasic polypropylene has a melt flow rate $MFR_2$ (230° C.) in the range of 3.0 to 30.0 g/10 min and—the second heterophasic polypropylene has a xylene cold soluble (XCS) content in the range of 7.0 to 20.0 wt.-%.

17 Claims, No Drawings

AUTOMOTIVE MATERIAL WITH EXCELLENT FLOW, HIGH STIFFNESS, EXCELLENT DUCTILITY AND LOW CLTE

RELATED APPLICATION

This application corres. to PCT/EP2010/057421, filed May 28, 2010, which claims priority from European Patent Application No. 09162277.9, filed Jun. 9, 2009, the subject matter of which are incorporated herein by reference in their entirety.

The present invention is directed to a new polypropylene composition, its use and preparation.

Polypropylene is the material of choice in many applications as it can be tailored to specific purposes needed. For instance heterophasic polypropylenes are widely used in the automobile industry (for instance in bumper applications) as they combine good stiffness with reasonable impact strength behavior. Heterophasic polypropylenes contain a polypropylene matrix in which an amorphous phase is dispersed. The amorphous phase contains a propylene copolymer rubber, like an ethylene propylene rubber (EPR) or an ethylene propylene diene monomer polymer (EPDM). Further the heterophasic polypropylene may contain a crystalline polyethylene to some extent. In the automotive industry such heterophasic polypropylenes grades contain an amount of about 30 wt.-% propylene copolymer rubber, which normally is produced directly in one or two gas phase reactors or added externally to the matrix via a compounding step. These materials are normally used in combination with 10 to 20 wt.-% filler, like talcum, which overall leads to materials offering a good balance of stiffness and impact strength. However nowadays the automotive exterior parts become bigger and bigger and therefore excellent flowability is necessary to overcome high pressure during injection molding. Another advantage of high flow materials is a reduction of cycle-time. Further there is an increasing demand to reduce the fuel consumption and thus weight reduction is a burning topic in the automotive industry. Weight reduction can be achieved with lower wall thickness, or material density. Lower wall thickness requires a higher stiffness. On the other hand the material has to have a high ductility at low temperatures to resist parking damages.

Thus the object of the present invention is to provide a material which exhibits good stiffness and ductility paired with good processability, in particular in terms of high flowability. Further it is appreciated that the material has rather low coefficient of linear thermal expansion.

The finding of the present invention is to add to a composition comprising a heterophasic polypropylene and a mineral filler, a further heterophasic material of higher melt flow.

Thus the present invention is directed to a composition having a melt flow rate $MFR_2$ (230° C.) measured according to ISO 1133 in the range of 10 to 50 g/10 min, said composition comprises a heterophasic polypropylene (H-PP1), a heterophasic polypropylene (H-PP2), a plastomer (P) and a mineral filler (F), wherein
(a) the melt flow rate $MFR_2$ (230° C.) measured according to ISO 1133 of the heterophasic polypropylene (H-PP2) is higher than the melt flow rate $MFR_2$ (230° C.) measured according to ISO 1133 of the heterophasic polypropylene (H-PP1),
(b) the heterophasic polypropylene (H-PP1) has a melt flow rate $MFR_2$ (230° C.) measured according to ISO 1133 in the range of 3.0 to 30.0 g/10 min and comprises
  (b1) a matrix (M1) being a propylene homopolymer and
  (b2) an elastomeric copolymer (E1) comprising units derived from
    propylene and
    ethylene and/or C4 to C20 α-olefin,
(c) the heterophasic polypropylene (H-PP2) has a xylene cold soluble (XCS) content measured according to ISO 6427 in the range of 7.0 to 20.0 wt.-% and comprises
  (c1) a matrix (M2) being a propylene homopolymer and
  (c2) an elastomeric copolymer (E2) comprising units derived from
    propylene and
    ethylene and/or C4 to C20 α-olefin, and
(d) the plastomer (P) is (chemically) different to the elastomeric copolymer (E1) and to the elastomeric copolymer (E2).

More precisely the present invention is directed to a composition having a melt flow rate $MFR_2$ (230° C.) measured according to ISO 1133 in the range of 10 to 50 g/10 min, said composition comprises
  20 to 40 wt.-%, preferably 25 to 35 wt.-%, of a heterophasic polypropylene (H-PP1),
  18 to 38 wt.-%, preferably 23 to 33 wt.-%, of a heterophasic polypropylene (H-PP2),
  12 to 30 wt.-%, preferably 15 to 25 wt.-%, of a plastomer (P) and
  15 to 30 wt.-%, preferably 18 to 28 wt.-%, of a mineral filler (F),
based on the composition, more preferably based on the components H-PP1, H-PP2, P and F, wherein
(a) the melt flow rate $MFR_2$ (230° C.) measured according to ISO 1133 of the heterophasic polypropylene (H-PP2) is higher than the melt flow rate $MFR_2$ (230° C.) measured according to ISO 1133 of the heterophasic polypropylene (H-PP1)
(b) the heterophasic polypropylene (H-PP1) has a melt flow rate $MFR_2$ (230° C.) measured according to ISO 1133 in the range of 3.0 to 30.0 g/10 min and comprises
  (b1) a matrix (M1) being a propylene homopolymer and
  (b2) an elastomeric copolymer (E1) comprising units derived from
    propylene and
    ethylene and/or C4 to C20 α-olefin,
(c) the heterophasic polypropylene (H-PP2) has a xylene cold soluble (XCS) content measured according to ISO 6427 in the range of 7.0 to 20.0 wt.-% and comprises
  (c1) a matrix (M2) being a propylene homopolymer and
  (c2) an elastomeric copolymer (E2) comprising units derived from
    propylene and
    ethylene and/or C4 to C20 α-olefin, and
(d) the plastomer (P) is (chemically) different to the elastomeric copolymer (E1) and to the elastomeric copolymer (E2).

It is apparent from the wording used for the different polymers (H-PP1, H-PP2, E1, E2 and P) according to the present invention that they must (chemically) differ from each other. The present invention is further characterized by the fact that neither the total composition nor its individual components have been visbroken, for instance by using peroxide compounds. Also none of the polymers employed is branched. In other words all polymer used according to this invention have a branching index g' of at least 0.90, more preferably of at least 0.95, like of 1.00.

In the expression "heterophasic" indicates that the elastomeric copolymers (E1) and (E2) are (finely) dispersed in the matrix (M1) and (M2), respectively. In other words the elastomeric copolymers (E1) and (E2) form inclusions in the matrix (M1) and (M2), respectively. Thus the matrix (M1) and (M2) contain (finely) dispersed inclusions being not part of the matrix and said inclusions contain the elastomeric copolymer (E1) and (E2), respectively. The term "inclusion"

according to this invention shall preferably indicate that the matrix and the inclusion form different phases within the heterophasic polypropylene composition (H-PP1) or (H-PP2), said inclusions are for instance visible by high resolution microscopy, like electron microscopy or scanning force microscopy. The final composition is probably of a complex structure. Probably the matrix (M1) and (M2) form a continuous phase being the matrix (M) of the composition wherein the elastomeric copolymers (E1) and (E2) and the plastomer (P) form together or individually inclusions dispersed therein.

Additionally the inclusions of the final composition may also contain the mineral filler (F); however preferably the filler (F) forms separate inclusions within the matrix (M). In another embodiment the matrix (M) contains (finely) dispersed inclusions being not part of the matrix (M) and said inclusions contain the elastomeric copolymers (E1), (E2) and the plastomer (P). In such a case the plastomer (P) may preferably form on its part inclusions (finely dispersed) within in the elastomeric copolymers.

Further the composition according to the present invention comprises preferably the heterophasic polypropylene (H-PP1), the heterophasic polypropylene (H-PP2), and the plastomer (P) as the only polymer components within the composition, i.e. no other polymer components are present.

It has been surprisingly found out that the composition according to this invention possess very good flowabilty by keeping the other properties, like stiffness and ductility, on the desired levels. In particular the flexural modulus, the impact at low temperatures and the coefficient of linear thermal expansion fulfill the requirements set by the automobile industry (see table 2).

The present invention will be now described in more detail.

One requirement is that the final composition has a rather high melt flow rate. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.). Accordingly, it is preferred that in the present invention the composition has an $MFR_2$ (230° C.) in a range of 10.0 to 50.0 g/10 min, preferably of 15.0 to 40.0 g/10 min, more preferably of 17.0 to 34.0 g/10 min, most preferably of 19.0 to 27.0 g/10 min.

Further, to obtain the desired melt flow properties of the composition the heterophasic polypropylene (H-PP1) and the heterophasic polypropylene (H-PP2) must differ in some properties. Accordingly one requirement is that the melt flow rate $MFR_2$ (230° C.) of the heterophasic polypropylene (H-PP2) is higher than the melt flow rate $MFR_2$ (230° C.) of the heterophasic polypropylene (H-PP1). More specifically it is appreciated that the melt flow rate $MFR_2$ (230° C.) of the heterophasic polypropylene (H-PP2) is at least 30 g/10 min, more preferably at least 50 g/10 min, higher than the melt flow rate $MFR_2$ (230° C.) of the heterophasic polypropylene (H-PP1). Accordingly it is in particular appreciated that the ratio of the melt flow rate $MFR_2$ (230° C.) of the heterophasic polypropylene (H-PP1) to the melt flow rate $MFR_2$ (230° C.) of the heterophasic polypropylene (H-PP2) [MFR(H-PP1)/MFR (H-PP2)] is in the range of 1:4 to 1:80, more preferably in the range of 1:5 to 1:50). But not only the melt flow rate of the heterophasic systems as such shall differ but preferably also the melt flow rate of the matrixes part of the respective heterophasic systems. A heterophasic system is featured by a xylene cold soluble (XCS) fraction and a xylene cold insoluble (XCI) fraction. In the present application the xylene cold insoluble (XCI) fraction of a heterophasic polypropylene is essentially identical with the matrix of said heterophasic polypropylene. Accordingly when talking about the melt flow rate of the matrix of a heterophasic polypropylene the melt flow rate of the xylene cold insoluble (XCI) fraction of said heterophasic polypropylene is meant. Accordingly the melt flow rate $MFR_2$ (230° C.) measured according to ISO 1133 of the xylene cold insoluble (XCI) fraction of the heterophasic polypropylene (H-PP1) is lower, preferably at least 80 g/10 min lower, more preferably at least 100 g/10 min lower, compared to the melt flow rate $MFR_2$ (230° C.) measured according to ISO 1133 of the xylene cold insoluble (XCI) fraction of the heterophasic polypropylene (H-PP2).

Additionally it has been recognized that especially suitable compositions are obtained in case also the xylene cold soluble (XCS) content of both heterophasic systems differ. Thus it is desired that the amount of xylene cold soluble (XCS) content of the heterophasic polypropylene (H-PP1) measured according to ISO 6427 is higher, preferably at least 8.0 wt.-% higher, more preferably at least 11.0 wt.-% higher, compared to the xylene cold soluble (XCS) content of the heterophasic polypropylene (H-PP2) measured according to ISO 6427. Accordingly it is appreciated that following formula (I), preferably (Ia), is fulfilled $$XCS(H\text{-}PP1) \geq 1.5 XCS(H\text{-}PP2) \tag{I}$$

$$XCS(H\text{-}PP1) \geq 1.7 XCS(H\text{-}PP2) \tag{Ia}$$

wherein

XCS(H-PP1) is the xylene soluble content measured according to ISO 6427 given in weight percentage of the heterophasic polypropylene (H-PP1), and XCS(H-PP2) is the xylene soluble content measured according to ISO 6427 given in weight percentage of the heterophasic polypropylene (H-PP2).

To achieve a good balance between stiffness and ductility also the intrinsic viscosity of the xylene cold soluble (XCS) fraction of the two heterophasic polypropylenes shall differ. Thus it is appreciated that the intrinsic viscosity (IV) measured according to ISO 1268-1 (decalin) of the xylene cold soluble (XCS) fraction of the heterophasic polypropylene (H-PP1) is higher compared to the intrinsic viscosity (IV) measured according to ISO 1268-1 (decalin) of the xylene cold soluble (XCS) fraction of the heterophasic polypropylene (H-PP2). More information about the individual intrinsic viscosities of the two heterophasic polypropylenes is given below.

Further it has been found out that especially good results are achievable in case the propylene content of the heterophasic polypropylene (H-PP2) is higher, at least 5.0 wt.-% higher, compared to the propylene content of the heterophasic polypropylene (H-PP1).

The heterophasic polypropylene (H-PP1) is a typical material used in this technical field. Accordingly the heterophasic polypropylene (H-PP1) has preferably a melt flow rate $MFR_2$ (230° C.) in the range of 3.0 to 30.0 g/10 min, more preferably in the range of 7.0 to 20.0 g/10 min, still more preferably in the range of 9.0 to 15.0 g/10 min.

As stated above the heterophasic polypropylene (H-PP1) according to this invention comprises
(a) a matrix (M1) being a propylene homopolymer and
(b) an elastomeric copolymer (E1) comprising units derived from
   propylene and
   ethylene and/or C4 to C20 α-olefin.

Preferably the propylene content in the heterophasic polypropylene (H-PP1) is 75.0 to 92.0 wt.-%, more preferably 80.0 to 90.0 wt.-%, based on the total heterophasic polypropylene (H-PP1), more preferably based on amount of the polymer components of the heterophasic polypropylene (H-PP1), yet more preferably based on the amount of the matrix (M1) and the elastomeric copolymer (E1) together. The remaining part constitutes the comonomers, preferably ethylene.

As defined herein a heterophasic polypropylene (H-PP1) comprises as polymer components only the polypropylene matrix (M1) and the elastomeric copolymer (E1). In other words the heterophasic polypropylene (H-PP1) may contain further additives but no other polymer in an amount exceeding 5 wt-%, more preferably exceeding 3 wt.-%, like exceeding 1 wt.-%, based on the total heterophasic polypropylene (H-PP1), more preferably based on the polymers present in the heterophasic polypropylene (H-PP1). One additional polymer which may be present in such low amounts is a polyethylene which is a reaction product obtained by the preparation of the heterophasic polypropylene (H-PP1). Accordingly it is in particular appreciated that a heterophasic polypropylene (H-PP1) as defined in the instant invention contains only a polypropylene matrix (M1), an elastomeric copolymer (E1) and optionally a polyethylene in amounts as mentioned in this paragraph. Further, throughout the present invention the xylene cold insoluble (XCI) fraction represents the matrix (M1) and optionally the polyethylene of the heterophasic polypropylene (H-PP1) whereas the xylene cold soluble (XCS) fraction represents the elastomeric part of the heterophasic polypropylene (H-PP1), i.e. the elastomeric copolymer (E1).

Accordingly the matrix (M1) content, i.e. the xylene cold insoluble (XCI) content, in the heterophasic polypropylene (H-PP1) is preferably in the range of 50.0 to 78.0 wt.-%, more preferably in the range of 55.0 to 75.0 wt.-%. In case polyethylene is present in the heterophasic polypropylene (H-PP1), the values for the matrix (M1) content but not for the xylene cold insoluble (XCI) content may be a bit decreased.

On the other hand the elastomeric copolymer (E1) content, i.e. the xylene cold soluble (XCS) content, in the heterophasic polypropylene (H-PP1) is preferably in the range of 22.0 to 50.0 wt.-%, more preferably in the range of 25.0 to 45.0 wt.-%.

The expression propylene homopolymer used in the instant invention relates to a polypropylene that consists substantially, i.e. of more than 99.5 wt.-%, still more preferably of at least 99.7 wt.-%, like of at least 99.8 wt.-%, of propylene units. In a preferred embodiment only propylene units in the propylene homopolymer are detectable. The comonomer content can be determined with FT infrared spectroscopy, as described below in the examples.

The expression "multimodal" or "bimodal" used throughout the present invention refers to the modality of the polymer, i.e.
  the form of its molecular weight distribution curve, which is the graph of the molecular weight fraction as a function of its molecular weight, and/or
  the form of its comonomer content distribution curve, which is the graph of the comonomer content as a function of the molecular weight of the polymer fractions.

As will be explained below, the heterophasic polypropylenes as well their individual components (matrix and elastomeric copolymer) can be produced by blending different polymer types, i.e. of different molecular weight and/or comonomer content. However it is preferred that the heterophasic polypropylenes as well their individual components (matrix and elastomeric copolymer) are produced in a sequential step process, using reactors in serial configuration and operating at different reaction conditions. As a consequence, each fraction prepared in a specific reactor will have its own molecular weight distribution and/or comonomer content distribution.

The matrix (M1) of the heterophasic polypropylene (H-PP1) being a propylene homopolymer can be multimodal or bimodal in view of the molecular weight.

Further it is appreciated that the matrix (M1) of the heterophasic polypropylene (H-PP1) has a moderate melt flow $MFR_2$ (230° C.). As stated above the melt flow rate $MFR_2$ (230° C.) of the matrix (M1) equates with the melt flow rate $MFR_2$ (230° C.) of the xylene cold insoluble (XCI) fraction of the heterophasic polypropylene (H-PP1). Thus it is preferred that the xylene cold insoluble (XCI) fraction of the heterophasic polypropylene (H-PP1) has a melt flow rate $MFR_2$ (230° C.) measured according to ISO 1133 of 20.0 to 150.0 g/10 min, more preferably of 25.0 to 90.0 g/10 min, still more preferably of 30.0 to 75.0 g/10 min.

Preferably the polypropylene matrix (M1) is isotactic. Accordingly it is appreciated that the polypropylene matrix (M1) has a rather high pentad concentration, i.e. higher than 80%, more preferably higher than 85%, yet more preferably higher than 90%, still more preferably higher than 92%, still yet more preferably higher than 93%, like higher than 95%.

The second component of the heterophasic polypropylene (H-PP1) is the elastomeric copolymer (E1).

The elastomeric copolymer (E1) comprises, preferably consists of, units derivable from (i) propylene and (ii) ethylene and/or at least another C4 to C20 α-olefin, like C4 to C10 α-olefin, more preferably units derivable from (i) propylene and (ii) ethylene and at least another α-olefin selected form the group consisting of 1-butene, 1-pentene, 1-hexene, 1-heptene and 1-octene. The elastomeric copolymer (E1) may additionally contain units derived from a conjugated diene, like butadiene, or a non-conjugated diene, however it is preferred that the elastomeric copolymer consists of units derivable from (i) propylene and (ii) ethylene and/or C4 to C20 α-olefins only. Suitable non-conjugated dienes, if used, include straight-chain and branched-chain acyclic dienes, such as 1,4-hexadiene, 1,5-hexadiene, 1,6-octadiene, 5-methyl-1,4-hexadiene, 3,7-dimethyl-1,6-octadiene, 3,7-dimethyl-1,7-octadiene, and the mixed isomers of dihydromyrcene and dihydro-ocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl)cyclohexane. Multi-ring alicyclic fused and bridged ring dienes are also suitable including tetrahydroindene, methyltetrahydroindene, dicyclopentadiene, bicyclo (2,2,1) hepta-2,5-diene, 2-methyl bicycloheptadiene, and alkenyl, alkylidene, cycloalkenyl and cycloalkylidene norbornenes, such as 5-methylene-2-norbornene, 5-isopropylidene norbornene, 5-(4-cyclopentenyl)-2-norbornene; and 5-cyclohexylidene-2-norbornene. Preferred non-conjugated dienes are 5-ethylidene-2-norbornene, 1,4-hexadiene and dicyclopentadiene.

Accordingly the elastomeric copolymer (E1) comprises at least units derivable from propylene and ethylene and may comprise other units derivable from a further α-olefin as defined in the previous paragraph. However it is in particular preferred that elastomeric copolymer (E1) comprises units only derivable from propylene and ethylene and optionally a conjugated diene, like butadiene, or a non-conjugated diene as defined in the previous paragraph, like 1,4-hexadiene. Thus an ethylene propylene non-conjugated diene monomer polymer (EPDM1) and/or an ethylene propylene rubber (EPR1) as elastomeric copolymer (E1) is especially preferred, the latter most preferred.

Like the matrix (M1) the elastomeric copolymer (E1) can be unimodal or multimodal, like bimodal, the latter being preferred. Concerning the definition of unimodal and multimodal, like bimodal, it is referred to the definition above.

In the present invention the content of units derivable from propylene in the elastomeric copolymer (EP1) equates with the content of propylene detectable in the xylene cold soluble (XCS) fraction. Accordingly the propylene detectable in the xylene cold soluble (XCS) fraction ranges from 50.0 to 75.0 wt.-%, more preferably 55.0 to 70.0 wt.-%. Thus in a specific embodiment the elastomeric copolymer (E1), i.e. the xylene cold soluble (XCS) fraction, comprises from 25.0 to 50.0 wt.-%, more preferably 30.0 to 45.0 wt.-%, units derivable from ethylene. Preferably the elastomeric copolymer (E1) is an ethylene propylene non-conjugated diene monomer polymer (EPDM1) or an ethylene propylene rubber (EPR1), the latter especially preferred, with a propylene and/or ethylene content as defined in this paragraph.

A further preferred requirement of the present invention is that the intrinsic viscosity (IV) of the xylene cold soluble (XCS) fraction of the heterophasic polypropylene (H-PP1) is rather high. Rather high values of intrinsic viscosity improve the impact strength. Accordingly it is appreciated that the intrinsic viscosity of the xylene cold soluble (XCS) fraction of the heterophasic polypropylene (H-PP1) is above 2.5 dl/g, more preferably at least 2.8 dl/g, yet more preferably at least 3.0 dl/g, like at least 3.3 dl/g. On the other hand the intrinsic viscosity should be not too high otherwise the flowability is decreased. Thus the intrinsic viscosity of the xylene cold soluble (XCS) fraction of the heterophasic polypropylene (H-PP1) is preferably in the range of 2.5 to 4.5 dl/g, more preferably in the range 3.0 to 4.1 dl/g, still more preferably 3.3 to 4.0 dl/g. The intrinsic viscosity is measured according to ISO 1628 in decaline at 135° C.

Preferably the heterophasic polypropylene (H-PP1) is α-nucleated. Examples of suitable α-nucleating agents are inorganic additives such as talc, silica or kaolin, salts of monocarboxylic or polycarboxylic acids, e.g. sodium benzoate or aluminum tert-butylbenzoate, dibenzylidenesorbitol or its $C_1$-$C_8$-alkyl-substituted derivatives such as methyldibenzylidenesorbitol, ethyldibenzylidenesorbitol or dimethyldibenzylidenesorbitol or salts of diesters of phosphoric acid, e.g. sodium 2,2'-methylenebis (4, 6,-di-tert-butylphenyl) phosphate or nonitol derivatives like 1,2,3-trideoxy-4,6:5,7-bis-O[(4-propylphenyl)methylene]-nonitol.

Accordingly preferred α-nucleating agents are selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), nonitol, 1,2,3,-trideoxy-4,6:5,7-bis-O-[(4-propylphenyl)methylene]-nonitol, and
(iii) salts of diesters of phosphoric acid, e.g. sodium 2,2'-methylenebis (4, 6,-di-tert-butylphenyl) phosphate or aluminium-hydroxy-bis[2,2'-methylene-bis(4,6-di-t-butylphenyl)phosphate], and
(iv) vinylcycloalkane polymer and vinylalkane polymer.

The nucleating agent content of the heterophasic polypropylene (H-PP1) is preferably up to 5 wt.-%.

Such additives are generally commercially available and are described, for example, in Gachter/Muller, Plastics Additives Handbook, 4th Edition, Hansa Publishers, Munich, 1993.

In a preferred embodiment, the heterophasic polypropylene (H-PP1) of the present invention contain from 0.1 to 1 wt.-%, preferably from 0.15 to 0.25 wt.-%, of a nucleating agent, in particular salts of diesters of phosphoric acid, e.g. sodium 2,2'-methylenebis (4, 6,-di-tert-butylphenyl)phosphate or aluminium-hydroxy-bis[2,2'-methylene-bis(4,6-di-t-butylphenyl)phosphate]. In another preferred embodiment the heterophasic polypropylene (H-PP1) is BNT nucleated as mentioned below.

In the following the heterophasic polypropylene (H-PP2) is defined in more detail:

The heterophasic polypropylene (H-PP2) is in particular featured by a rather high melt flow rate. Accordingly the heterophasic polypropylene (H-PP2) has preferably a melt flow rate $MFR_2$ (230° C.) in the range of 40.0 to 1000.0 g/10 min, more preferably in the range of 60.0 to 500.0 g/10 min, still more preferably in the range of 70 to 200 g/10 min.

Further, as stated above the heterophasic polypropylene (H-PP2) according to this invention comprises
(a) a matrix (M2) being a propylene homopolymer and
(b) an elastomeric copolymer (E2) comprising units derived from
propylene and
ethylene and/or C4 to C20 α-olefin.

Preferably the propylene content in the heterophasic polypropylene (H-PP2) is 85.0 to 96.0 wt.-%, more preferably 88.0 to 94.0 wt.-%, based on the total heterophasic polypropylene (H-PP2), more preferably based on amount of the polymer components of the heterophasic polypropylene (H-PP2), yet more preferably based on the amount of the matrix (M2) and the elastomeric copolymer (E2) together. The remaining part constitutes the comonomers, preferably ethylene.

Concerning the definition of a heterophasic polypropylene, see the information provided when discussing the heterophasic polypropylene (H-PP1). Accordingly the heterophasic polypropylene (H-PP2) comprises as polymer components only the polypropylene matrix (M2) and the elastomeric copolymer (E2). In other words the heterophasic polypropylene (H-PP2) may contain further additives but no other polymer in an amount exceeding 5 wt-%, more preferably exceeding 3 wt.-%, like exceeding 1 wt.-%, based on the total heterophasic polypropylene (H-PP2), more preferably based on the polymers present in the heterophasic polypropylene (H-PP2). One additional polymer which may be present in such low amounts is a polyethylene which is a reaction product obtained by the preparation of the heterophasic polypropylene (H-PP2). Accordingly it is in particular appreciated that a heterophasic polypropylene (H-PP2) as defined in the instant invention contains only a polypropylene matrix (M2), an elastomeric copolymer (E2) and optionally a polyethylene in amounts as mentioned in this paragraph. Further, throughout the present invention the xylene cold insoluble (XCI) fraction represents the matrix (M2) of the heterophasic polypropylene (H-PP2) and optionally the polyethylene whereas the xylene cold soluble (XCS) fraction represents the elastomeric part of the heterophasic polypropylene (H-PP2), i.e. the elastomeric copolymer (E2).

Accordingly the matrix (M2) content, i.e. the xylene cold insoluble (XCI) content, in the heterophasic polypropylene (H-PP2) is preferably in the range of 80.0 to 93.0 wt.-%, more preferably in the range of 82.0 to 91.0 wt.-%, like 83.0 to 89.0 wt.-%. In case polyethylene is present in the heterophasic polypropylene (H-PP2), the values for the matrix (M2) content but not for the xylene cold insoluble (XCI) content may be a bit decreased.

On the other hand the elastomeric copolymer (E2) content, i.e. the xylene cold soluble (XCS) content, in the heterophasic polypropylene (H-PP2) is preferably in the range of 7.0 to 20.0 wt.-%, more preferably in the range of 9.0 to 18.0 wt.-%, like 11.0 to 17.0 wt.-%.

The matrix (M2) of the heterophasic polypropylene (H-PP2) being a propylene homopolymer can be multimodal or bimodal in view of the molecular weight, however it is preferred that the matrix (M2) is multimodal, like bimodal, in view of the molecular weight.

Further and preferably the polypropylene matrix (M2) has a rather high melt flow rate. Accordingly, it is preferred that in the present invention the polypropylene matrix (M2), i.e. the xylene cold insoluble (XCI) fraction of the heterophasic polypropylene (H-PP2), has an $MFR_2$ (230° C.) in a range of 100.0 to 1500.0 g/10 min, more preferably of 120.0 to 800.0 g/10 min, still more preferably of 150.0 to 500.0 g/10 min.

Preferably the polypropylene matrix (M2) is isotactic. Accordingly it is appreciated that the polypropylene matrix (M2) has a rather high pentad concentration, i.e. higher than 80%, more preferably higher than 85%, yet more preferably higher than 90%, still more preferably higher than 92%, still yet more preferably higher than 93%, like higher than 95%.

The second component of the heterophasic polypropylene (H-PP2) is the elastomeric copolymer (E2).

The elastomeric copolymer (E2) comprises, preferably consists of, units derivable from (i) propylene and (ii) ethylene and/or at least another C4 to C20 α-olefin, like C4 to C10 α-olefin, more preferably units derivable from (i) propylene and (ii) ethylene and at least another α-olefin selected form the group consisting of 1-butene, 1-pentene, 1-hexene, 1-heptene and 1-octene. The elastomeric copolymer (E1) may additionally contain units derived from a conjugated diene, like butadiene, or a non-conjugated diene, however it is preferred that the elastomeric copolymer consists of units derivable from (i) propylene and (ii) ethylene and/or C4 to C20 α-olefins only. Suitable non-conjugated dienes, if used, include straight-chain and branched-chain acyclic dienes, such as 1,4-hexadiene, 1,5-hexadiene, 1,6-octadiene, 5-methyl-1,4-hexadiene, 3,7-dimethyl-1,6-octadiene, 3,7-dimethyl-1,7-octadiene, and the mixed isomers of dihydromyrcene and dihydro-ocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl)cyclohexane. Multi-ring alicyclic fused and bridged ring dienes are also suitable including tetrahydroindene, methyltetrahydroindene, dicyclopentadiene, bicyclo (2,2,1) hepta-2,5-diene, 2-methyl bicycloheptadiene, and alkenyl, alkylidene, cycloalkenyl and cycloalkylidene norbornenes, such as 5-methylene-2-norbornene, 5-isopropylidene norbornene, 5-(4-cyclopentenyl)-2-norbornene; and 5-cyclohexylidene-2-norbornene. Preferred non-conjugated dienes are 5-ethylidene-2-norbornene, 1,4-hexadiene and dicyclopentadiene.

Accordingly the elastomeric copolymer (E2) comprises at least units derivable from propylene and ethylene and may comprise other units derivable from a further α-olefin as defined in the previous paragraph. However it is in particular preferred that elastomeric copolymer (E2) comprises units only derivable from propylene and ethylene and optionally a conjugated diene, like butadiene, or a non-conjugated diene as defined in the previous paragraph, like 1,4-hexadiene. Thus an ethylene propylene non-conjugated diene monomer polymer (EPDM2) and/or an ethylene propylene rubber (EPR2) as elastomeric copolymer (E2) is especially preferred, the latter most preferred.

Like the matrix (M2) the elastomeric copolymer (E2) can be unimodal or multimodal, like bimodal. Concerning the definition of unimodal and multimodal, like bimodal, it is referred to the definition above.

In the present invention the content of units derivable from propylene in the elastomeric copolymer (EP2) equates with the content of propylene detectable in the xylene cold soluble (XCS) fraction. Accordingly the propylene detectable in the xylene cold soluble (XCS) fraction ranges from 50.0 to 75.0 wt.-%, more preferably 55.0 to 70.0 wt.-%. Thus in a specific embodiment the elastomeric copolymer (E2), i.e. the xylene cold soluble (XCS) fraction, comprises from 25.0 to 50.0 wt.-%, more preferably 30.0 to 45.0 wt.-%, units derivable from ethylene. Preferably the elastomeric copolymer (E2) is an ethylene propylene non-conjugated diene monomer polymer (EPDM2) or an ethylene propylene rubber (EPR2), the latter especially preferred, with a propylene and/or ethylene content as defined in this paragraph.

A further preferred requirement of the present invention is that the intrinsic viscosity (IV) of the xylene cold soluble (XCS) fraction of the heterophasic polypropylene (H-PP2) is rather low. Rather high values of intrinsic viscosity improve the ductility of the heterophasic system. Accordingly it is appreciated that the intrinsic viscosity of the xylene cold soluble (XCS) fraction of the heterophasic polypropylene (H-PP2) is below 3.0 dl/g, more preferably below 2.8 dl/g, yet more preferably below 2.5 dl/g. Even more preferred the intrinsic viscosity of the xylene cold soluble (XCS) fraction of the heterophasic polypropylene (H-PP2) is in the range of 1.8 to 3.0 dl/g, more preferably in the range 1.9 to 2.8 dl/g, still more preferably 2.1 to 2.5 dl/g. The intrinsic viscosity is measured according to ISO 1628 in decaline at 135° C.

A further essential requirement is the present of a plastomer (P). The plastomer (P) is (chemically) different to the elastomeric copolymers (E1) and (E2) of the heterophasic systems. More precisely the plastomer (P) is a linear low density polyethylene (LLDPE). Accordingly the plastomer (P), i.e. the linear low density polyethylene (LLDPE), has a density measured according to ISO 1183-187 in the range 820 to 900 kg/m$^3$, more preferably in the range of 850 to 900 kg/m$^3$, yet more preferably in the range of 840 to 880 kg/m$^3$, like in the range of 860 to 885 kg/m$^3$)

Further the plastomer (P), i.e. the linear low density polyethylene (LLDPE), is featured by a specific melt flow rate, namely by a melt flow rate $MFR_2$ (190° C.) measured according to ISO 1133 in the range of 3.0 to 15.0 g/10 min, more preferably in the range of 4.0 to 10.0 g/10 min.

Preferably the plastomer (P), i.e. the linear low density polyethylene (LLDPE), is a copolymer containing as a major part units derivable from ethylene. Accordingly it is appreciated that the plastomer (P), i.e. the linear low density polyethylene (LLDPE), comprises at least 50.0 wt.-% units derivable from ethylene, more preferably at least 55.0 wt.-% of units derived from ethylene. Thus it is appreciated that the plastomer (P), i.e. the linear low density polyethylene (LL-DPE), comprises 50.0 to 70.0 wt.-%, more preferably 55.0 to 65 wt.-%, units derivable from ethylene. The comonomers present in the plastomer (P), i.e. the linear low density polyethylene (LLDPE), are C4 to C20 α-olefins, like 1-butene, 1-hexene and 1-octene, the latter especially preferred. Accordingly in one specific embodiment the plastomer (P), i.e. the linear low density polyethylene (LLDPE), is an ethylene-1-octene polymer with the amounts given in this paragraph.

As a further requirement the present composition requires the presence of a mineral filler (F). Preferably the mineral filler (F) is a phyllosilicate, mica or wollastonite. Even more preferred the mineral filler (F) is selected from the group consisting of mica, wollastonite, kaolinite, smectite, montmorillonite and talc. The most preferred the mineral filler (F) is talc.

The mineral filler (F) preferably has a particle size (d97%) of below 10.0 μm (d97% indicates that 97 wt-% of the filler has a particle size below 10.0 μm), more preferably below 7.0 μm.

Typically the mineral filler (F) has a surface area measured according to the commonly known BET method with $N_2$ gas as analysis adsorptive of less than 20 $m^2$/g, more preferably of less than 15 $m^2$/g, yet more preferably of less than 10 $m^2$/g. In some embodiments, the mineral filler (F) shows a surface area of 7 $m^2$/g or less. Mineral fillers (F) fulfilling these requirements are preferably anisotropic mineral fillers (F), like talc, mica and wollastonite. An especially preferred filler is talc.

The instant composition may additional contain typical other additives useful in the automobile sector, like carbon black, other pigments, antioxidants, UV stabilizers, nucleating agents, antistatic agents and slip agents, in amounts usual in the art.

All components used for the preparation of the instant composition are known. Accordingly also their preparation is well known. For instance the heterophasic polypropylenes according to this invention are preferably produced in a multistage process known in the art, wherein the matrix is produced at least in one slurry reactor and subsequently the elastomeric copolymer is produced at least in one gas phase reactor.

Thus, the polymerization system can comprise one or more conventional stirred slurry reactors and/or one or more gas phase reactors. Preferably the reactors used are selected from the group of loop and gas phase reactors and, in particular, the process employs at least one loop reactor and at least one gas phase reactor. It is also possible to use several reactors of each type, e.g. one loop and two or three gas phase reactors, or two loops and one or two gas phase reactors, in series.

Preferably the process comprises also a prepolymerization with the chosen catalyst system, as described in detail below, comprising the Ziegler-Natta procatalyst, the external donor and the cocatalyst.

In a preferred embodiment, the prepolymerisation is conducted as bulk slurry polymerisation in liquid propylene, i.e. the liquid phase mainly comprises propylene, with minor amount of other reactants and optionally inert components dissolved therein.

The prepolymerisation reaction is typically conducted at a temperature of 0 to 50° C., preferably from 10 to 45° C., and more preferably from 15 to 40° C.

The pressure in the prepolymerisation reactor is not critical but must be sufficiently high to maintain the reaction mixture in liquid phase. Thus, the pressure may be from 20 to 100 bar, for example 30 to 70 bar.

The catalyst components are preferably all introduced to the prepolymerisation step. However, where the solid catalyst component (i) and the cocatalyst (ii) can be fed separately it is possible that only a part of the cocatalyst is introduced into the prepolymerisation stage and the remaining part into subsequent polymerisation stages. Also in such cases it is necessary to introduce so much cocatalyst into the prepolymerisation stage that a sufficient polymerisation reaction is obtained therein.

It is possible to add other components also to the prepolymerisation stage. Thus, hydrogen may be added into the prepolymerisation stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

A slurry reactor designates any reactor, such as a continuous or simple batch stirred tank reactor or loop reactor, operating in bulk or slurry and in which the polymer forms in particulate form. "Bulk" means a polymerization in reaction medium that comprises at least 60 wt.-% monomer. According to a preferred embodiment the slurry reactor comprises a bulk loop reactor.

"Gas phase reactor" means any mechanically mixed or fluid bed reactor. Preferably the gas phase reactor comprises a mechanically agitated fluid bed reactor with gas velocities of at least 0.2 msec.

The particularly preferred embodiment for the preparation of the heterophasic polypropylenes of the invention comprises carrying out the polymerization in a process comprising either a combination of one loop and one or two gas phase reactors or a combination of two loops and one or two gas phase reactors.

A preferred multistage process is a slurry-gas phase process, such as developed by Borealis and known as the Borstar® technology. In this respect, reference is made to EP 0 887 379 A1, WO 92/12182, WO 2004/000899, WO 2004/111095, WO 99/24478, WO 99/24479 and WO 00/68315. They are incorporated herein by reference.

A further suitable slurry-gas phase process is the Spheripol® process of Basell.

Preferably the heterophasic polypropylene composition according to this invention are produced by using a special Ziegler-Natta procatalyst in combination with a special external donor, as described below in detail, preferably in the Spheripol® or in the Borstar®-PP process.

One preferred multistage process may therefore comprise the steps of:
producing a polypropylene matrix in the presence of the chosen catalyst system, as for instance described in detail below, comprising the special Ziegler-Natta procatalyst (i), an external donor (iii) and the cocatalyst (ii) in a first slurry reactor and optionally in a second slurry reactor, both slurry reactors using the same polymerization conditions,
transferring the slurry reactor product into at least one first gas phase reactor, like one gas phase reactor or a first and a second gas phase reactor connected in series,
producing an elastomeric copolymer in the presence of the polypropylene matrix and in the presence of the catalyst system in said at least first gas phase reactor,
recovering the polymer product for further processing.

With respect to the above-mentioned preferred slurry-gas phase process, the following general information can be provided with respect to the process conditions.

Temperature is preferably from 40 to 110° C., preferably between 50 and 100° C., in particular between 60 and 90° C., with a pressure in the range of from 20 to 80 bar, preferably 30 to 60 bar, with the option of adding hydrogen in order to control the molecular weight in a manner known per se.

The reaction product of the slurry polymerization, which preferably is carried out in a loop reactor, is then transferred to the subsequent gas phase reactor(s), wherein the temperature preferably is within the range of from 50 to 130° C., more preferably 60 to 100° C., at a pressure in the range of from 5 to 50 bar, preferably 8 to 35 bar, again with the option of adding hydrogen in order to control the molecular weight in a manner known per se.

The average residence time can vary in the reactor zones identified above. In one embodiment, the average residence time in the slurry reactor, for example a loop reactor, is in the range of from 0.5 to 5 hours, for example 0.5 to 2 hours, while the average residence time in the gas phase reactor generally will be from 1 to 8 hours.

If desired, the polymerization may be effected in a known manner under supercritical conditions in the slurry, preferably loop reactor, and/or as a condensed mode in the gas phase reactor.

According to the invention the heterophasic polypropylenes are preferably obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

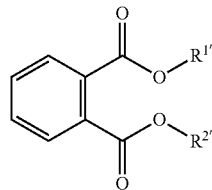

(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor
c) washing the product of stage b) or
d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2$*nROH, wherein R is methyl or ethyl, preferably ethyl and n is 1 to 6, is contacting with $TiCl_4$ to form a titanised carrier, followed by the steps of
adding to said titanised carrier
(i) a dialkylphthalate of formula (I) with $R^{1'}$ and $R^{2'}$ being independently at least a $C_5$-alkyl, like at least a $C_8$-alkyl,
or preferably
(ii) a dialkylphthalate of formula (I) with $R^{1'}$ and $R^{2'}$ being the same and being at least a $C_5$-alkyl, like at least a $C_8$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

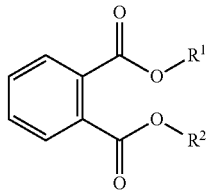

(II)

with $R^1$ and $R^2$ being methyl or ethyl, preferably ethyl, the dialkylphthalat of formula (II) being the internal donor and
recovering said transesterification product as the procatalyst composition (component (i)).

The adduct of the formula $MgCl_2$*nROH, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most.

Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the BC-1 catalyst of Borealis (prepared according to WO 92/19653 as disclosed in WO 99/24479; especially with the use of dioctylphthalate as dialkylphthalate of formula (I) according to WO 92/19658) or the catalyst Polytrack 8502, commercially available from Grace.

In a further embodiment, the Ziegler-Natta procatalyst can be modified by polymerising a vinyl compound in the presence of the catalyst system, comprising the special Ziegler-Natta procatalyst, an external donor and a cocatalyst, which vinyl compound has the formula:

$CH_2=CH-CHR^3R^4$ wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic polypropylene composition according to this invention. The polymerized vinyl compound can act as an α-nucleating agent. This modification is in particular used for the preparation of the heterophasic polypropylene (H-PP1).

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

For the production of the heterophasic polypropylenes according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (III)

$Si(OCH_3)_2R_2^5$ (III)

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

More preferably the external donor is either dicyclopentyl dimethoxy silane $[Si(OCH_3)_2(cyclo-pentyl)_2]$ or diisopropyl dimethoxy silane $[Si(OCH_3)_2(CH(CH_3)_2)_2]$.

The additives as stated above are added afterwards to the heterophasic polypropylenes, which are collected from the final reactor of the series of reactors. Preferably, these additives are mixed into the heterophasic polypropylenes to or during the extrusion process in a one-step compounding process. Alternatively, a master batch may be formulated, wherein the heterophasic polypropylenes are first mixed with only some of the additives.

The plastomer (P), i.e. the linear low density polyethylene (LLDPE), can be manufactured in a slurry loop reactor using a single site catalyst, e.g. metallocene catalyst. Suitable metallocenes and ways of preparing them are within the knowledge and skills of a person skilled in the field. Reference is made to EP 0 260 130, WO 97/28170, WO 98/46616, WO 98/49208, WO 99/12981, WO 99/19335, EP 0 836 608, WO 98/56831, WO 00/34341, EP 0 423101 and EP 0 537 130. Especially preferred the plastomer (P), i.e. the linear low density polyethylene (LLDPE), is made using a hafnium metallocene such as a bis(n-butylcyclopentadienyl) hafnium dichloride or a bis(n-butylcyclopentadienyl) hafnium dibenzyl. Other potential catalysts are described in WO 97/28170 and WO 00/40620

For slurry reactors, the reaction temperature will generally be in the range 60 to 110° C. (e.g. 85 to 110° C.), the reactor pressure will generally be in the range 5 to 80 bar (e.g. 50 to 65 bar), and the residence time will generally be in the range 0.3 to 5 hours (e.g. 0.5 to 2 hours). The diluent used will generally be an aliphatic hydrocarbon having a boiling point in the range −70 to +100° C. In such reactors, polymerisation may if desired be effected under supercritical conditions. Preferably, the polymer is produced in a continuously operating loop reactor where ethylene is polymerised in the presence of a polymerisation catalyst as stated above and a chain transfer agent such as hydrogen. The diluent is typically an inert aliphatic hydrocarbon, preferably isobutane or propane. The plastomer (P) may contain various standard polymer additives such as antioxidants, UV stabilisers and polymer processing agents.

For mixing the individual components of the instant composition, a conventional compounding or blending apparatus, e.g. a Banbury mixer, a 2-roll rubber mill, Buss-co-kneader or a twin screw extruder may be used. The polymer materials recovered from the extruder are usually in the form of pellets. These pellets are then preferably further processed, e.g. by injection moulding to generate articles and products of the inventive composition.

Accordingly the present invention is also directed to a process for the preparation of the instant composition comprising the steps of adding the heterophasic polypropylene (H-PP1), the heterophasic polypropylene (H-PP2), the plastomer (P), and the mineral filler (F) to an extruder (as mentioned above) and extruding the same obtaining thereby said composition.

The composition according to the invention may be pelletized and compounded using any of the variety of compounding and blending methods well known and commonly used in the resin compounding art.

The composition of the present invention is preferably used for the production of moulded articles, preferably injection moulded articles. Even more preferred is the use for the production of automotive articles, especially of car interiors and exteriors, like bumpers, side trims, step assists, body panels, spoilers, dashboards, interior trims and the like.

The current invention also provides articles, like injection molded articles, comprising the inventive polypropylene composition. Accordingly the present invention is especially directed to automotive articles, especially to car interiors and exteriors, like bumpers, side trims, step assists, body panels, spoilers, dashboards, interior trims and the like, comprising the inventive polypropylene composition.

The present invention will now be described in further detail by the examples provided below.

EXAMPLES

1. Definitions/Measuring Methods

The following definitions of terms and determination methods apply for the above general description of the invention as well as to the below examples unless otherwise defined.

Quantification of Isotacticity in Polypropylene by $^{13}C$ NMR Spectroscopy

The isotacticity is determined by quantitative $^{13}C$ nuclear magnetic resonance (NMR) spectroscopy after basic assignment as e.g. in: V. Busico and R. Cipullo, Progress in Polymer Science, 2001, 26, 443-533. Experimental parameters are adjusted to ensure measurement of quantitative spectra for this specific task as e.g in: S. Berger and S. Braun, 200 and More NMR Experiments: A Practical Course, 2004, Wiley-VCH, Weinheim. Quantities are calculated using simple corrected ratios of the signal integrals of representative sites in a manner known in the art. The isotacticity is determined at the pentad level i.e. mmmm fraction of the pentad distribution.

Density is measured according to ISO 1183-187. Sample preparation is done by compression moulding in accordance with ISO 1872-2:2007.

$MFR_2$ (230° C.) is measured according to ISO 1133 (230° C., 2.16 kg load).

$MFR_2$ (190° C.) is measured according to ISO 1133 (190° C., 2.16 kg load).

Quantification of Comonomer Content by FTIR Spectroscopy

The comonomer content is determined by quantitative Fourier transform infrared spectroscopy (FTIR) after basic assignment calibrated via quantitative $^{13}C$ nuclear magnetic resonance (NMR) spectroscopy in a manner well known in the art. Thin films are pressed to a thickness of between 100-500 μm and spectra recorded in transmission mode. Specifically, the ethylene content of a polypropylene-co-ethylene copolymer is determined using the baseline corrected peak area of the quantitative bands found at 720-722 and 730-733 $cm^{-1}$. Quantitative results are obtained based upon reference to the film thickness.

Intrinsic viscosity is measured according to DIN ISO 1628/1, October 1999 (in Decalin at 135° C.).

Tensile Modulus; Elongation at break; Yield Stress are measured according to ISO 527-2 (cross head speed=50 mm/min; 23° C.) using injection molded specimens as described in EN ISO 1873-2 (dog bone shape, 4 mm thickness).

Flexural Modulus: The flexural modulus was determined in 3-point-bending according to ISO 178 on injection molded specimens of 80×10×4 mm prepared in accordance with ISO 294-1:1996.

Coefficient of linear thermal expansion: The coefficient of linear thermal expansion (CLTE) was determined in accordance with ISO 11359-2:1999 on 10 mm long pieces cut from the same injection molded specimens as used for the flexural modulus determination. The measurement was performed in a temperature range from +23 to +80° C. at a heating rate of 1° C./min.

Charpy impact test: The Charpy notched impact strength (Charpy NIS) is measured according to ISO 179 2C/DIN 53453 at 23° C., −20° C. and −30° C., using injection molded bar test specimens of 80×10×4 $mm^3$ $mm^3$ prepared in accordance with ISO 294-1:1996.

Heat Distortion Temperature (HDT) was determined according to ISO 75 A using injection molded test specimens as described in EN ISO 1873-2 (80×10×4 mm).

Vicat A is measured according to ISO 306 using injection molded test specimens as described in EN ISO 1873-2 (80×10×4 mm).

The xylene cold solubles (XCS, wt.-%): Content of Xylene solubles (XCS) is determined at 23° C. according ISO 6427.

Particle size d97 is calculated from the particle size distribution as determined by laser diffraction according to ISO 13320-1:1999.

Surface area is determined as the BET surface according to ISO 787-11 with nitrogen ($N_2$).

2. Examples

TABLE 1

The heterophasic polypropylenes (HECO) used

|  |  | HECO 1 | HECO 2 | HECO 3 | HECO 4 |
|---|---|---|---|---|---|
| MFR | [g/10 min] | 12.0 | 85 | 11.0 | 100.0 |
| MFR of XCI | [g/10 min] | 35.0 | 18.0 | 55.0 | 160 |
| XCS | [wt %] | 29.8 | 29.0 | 30.0 | 15 |
| C2 total | [wt %] | 15.8 | 20.0 | 12.5 | 8.0 |
| C2 in XCS | [wt %] | 45 | 52 | 38 | 39 |
| IV of XCS | [dl/g] | 1.9 | 2.4 | 2.5 | 1.9 |

"HECO 1" is the commercial product EE041AE of Borealis
"HECO 2" is the commercial product EF015AE of Borealis
"HECO 3" is the commercial product EE050AE of Borealis
"HECO 4" is the commercial product BJ356MO of Borealis

TABLE 2

Compositions

|  |  | CE 1 | CE 2 | E 1 |
|---|---|---|---|---|
| HECO 1 | [wt %] |  | 63.95 |  |
| HECO 2 | [wt %] | 65.33 |  |  |
| HECO 3 | [wt %] |  |  | 29.18 |
| HECO 4 | [wt %] |  |  | 27.0 |
| Elastomer 1 | [wt %] | 5.0 | 10.5 |  |
| Elastomer 2 | [wt %] |  |  | 18.5 |
| Elastomer 3 | [wt %] | 5.0 |  |  |
| Talc | [wt %] | 23.0 | 23.0 | 23.0 |
| Carbon black | [wt %] | 1.3 | 1.5 | 1.5 |
| AO1 | [wt %] | 0.07 | 0.15 | 0.15 |
| AO2 | [wt %] |  | 0.10 | 0.07 |
| Glycerol ester | [wt %] | 0.30 | 0.30 | 0.30 |
| Ca-Stearate | [wt %] |  |  | 0.30 |
| PDX PP5% | [wt %] |  | 0.5 |  |
| MFR | [g/10 min] | 14.0 | 21.8 | 20.0 |
| Ash 600° C. (Filler content) | [%] | 23.1 | 22.9 | 23.2 |
| Density | [kg/m³] | 1.04 | 1.03 | 1.04 |
| Tensile Modulus | [MPa] | 1486 | 1339 | 1450 |
| Tensile Stress @ yield | [MPa] | 16.2 | 15.8 | 16.9 |
| Tensile Strain @ yield | [%] | 6.0 | 5.2 | 6.1 |
| Tensile Stress @ break | [MPa] | 14.2 | 10.5 | 13.5 |
| Tensile Strain @ break | [%] | 336 | 48 | 300 |
| Flexural Modulus | [MPa] | 1618 | 1413 | 1610 |
| Flex Strain @ Flex strength | [%] | 5.0 | 5.0 | 5.1 |
| Charpy 1eA +23° C. | [kJ/m²] | 63.0 | 47.8 | 49.6 |
| Charpy 1eA −30° C. | [kJ/m²] | 5.0 | 4.4 | 4.5 |
| HDT A @ 1.8 MPa | [° C.] | 49 | 48 | 51 |
| Vicat A | [° C.] | 113 | 112 | 115 |
| Shrinkage radial | [%] | 0.66 | 0.61 | 0.59 |
| Shrinkage tangential | [%] | 0.62 | 0.53 | 0.54 |
| CLTE +23/80 | [10E-05 μm/mK] | 58 | 68 | 51 |
| Biaxial impact test ASTM |  | ductile break @ | ductile break @ | ductile break @ |

TABLE 2-continued

| | Compositions | | |
|---|---|---|---|
| | | Example | |
| | CE 1 | CE 2 | E 1 |
| D3763. specimen C 2.2 m/s impact velocity | −30° C. | −30° C. | −30° C. |

"Elastomer 1" is the commercial product Engage 8100 of Dow Elastomers
"Elastomer 2" is the commercial product Engage 8200 of Dow Elastomers
"Elastomer 3" is the commercial product Engage 8400 of Dow Elastomers
"Talc" is the commercial talc Jetfine 3CA of Luzenac Europe, France
"Carbon black" is the commercial master batch "Plasblak PE4103" of Cabot
"AO1" is the commercial phenolic antioxidant Irganox 1076 of Ciba
"AO2" is the commercial phosphorous antioxidant Irgafos 168 of Ciba
"Glycerol ester" is commercial Atmer 129 of Ciba
"POX PP5%" is the commercial peroxide master batch DHBP-5-IC5 of Degussa

The invention claimed is:

1. A composition having a melt flow rate $MFR_2$ (230° C.) measured according to ISO 1133 in the range of 10 to 50 g/10 min.,
said composition comprises a heterophasic polypropylene (H-PP1), a heterophasic polypropylene (H-PP2), a plastomer (P) and a mineral filler (F), wherein
(a) the heterophasic polypropylene (H-PP1) has a melt flow rate $MFR_2$ (230° C.) measured according to ISO 1133 in the range of 3.0 to 30.0 g/10 min and comprises
(a1) a matrix (M1) being a propylene homopolymer and
(a2) an elastomeric copolymer (E1) comprising units derived from propylene and ethylene and/or C4 to C20 α-olefin.
(b) the heterophasic polypropylene (H-PP2) has a melt flow rate $MFR_2$ (230° C.) measured according to ISO 1133 in the range of 40.0 to 1000.0 g/10 min and
a xylene cold soluble (XCS) content measured according to ISO 6427 in the range of 7.0 to 20.0 wt.-% and comprises
(b1) a matrix (M2) being a propylene homopolymer and
(b2) an elastomeric copolymer (E2) comprising units derived from propylene and ethylene and/or C4 to C20 α-olefin, and
(c) the plastomer (P) is different to the elastomeric copolymer (E1) and to the elastomeric copolymer (E2).

2. The composition according to claim 1, wherein the xylene cold soluble (XCS) content of the heterophasic polypropylene (H-PP1) measured according to ISO 6427 is
(a) higher compared to the xylene cold soluble (XCS) content of the heterophasic polypropylene (H-PP2) measured according to ISO 6427 and/or
(b) in the range of 22.0 to 50.0 wt.-%.

3. The composition according to claim 1, wherein the heterophasic polypropylene (H-PP1) has
(a) a total propylene content 75.0 to 92.0 wt.-% and/or
(b) a propylene content in the xylene cold soluble (XCS) fraction of 50.0 to 75.0 wt.-%.

4. The composition according to claim 1, wherein the intrinsic viscosity (IV) measured according to ISO 1268-1 (decalin) of the xylene cold soluble (XCS) fraction of the heterophasic polypropylene (H-PP1) is
(a) higher compared to the intrinsic viscosity (IV) measured according to ISO 1268-1 (decalin) of the xylene cold soluble (XCS) fraction of the heterophasic polypropylene (H-PP2) and/or
(b) above 2.5 dl/g.

5. The composition according to claim 1 wherein the melt flow rate $MFR_2$ (230° C.) measured according to ISO 1133 of the xylene cold insoluble (XCI) fraction of the heterophasic polypropylene (H-PP1) is
(a) lower compared to the melt flow rate $MFR_2$ (230° C.) measured according to ISO 1133 of the xylene cold insoluble (XCI) fraction of the heterophasic polypropylene (H-PP2) and/or
(b) in the range of 20.0 to 150.0 g/10 min.

6. The composition according to claim 1, wherein the melt flow rate $MFR_2$ (230° C.) measured according to ISO 1133 of the xylene cold insoluble (XCI) fraction of the heterophasic polypropylene (H-PP2) is in the range of 100.0 to 1500.0 g/10 min.

7. The composition according to any one of the preceding claims, wherein the heterophasic polypropylene (H-PP2) has
(a) a total propylene content 85.0 to 96.0 wt.-% and/or
(b) a higher total propylene content compared to the heterophasic polypropylene (H-PP1) and/or
(c) a propylene content in the xylene cold soluble (XCS) fraction of 50.0 to 75.0 wt.-%.

8. The composition according to claim 1, wherein the intrinsic viscosity (IV) measured according to ISO 1268-1 (decalin) of the xylene cold soluble (XCS) fraction of the heterophasic polypropylene (H-PP2) is below 3.0 dl/g.

9. The composition according to claim 1, wherein the plastomer (P) is a linear low density polyethylene (LLDPE).

10. The composition according to claim 1, wherein the plastomer (P)
(a) comprises units derived from ethylene and at least one C4 to C20 α-olefin and/or
(b) has an ethylene content of at least 50 wt.-%.

11. The composition according to claim 1, wherein the plastomer (P) has
(a) a density measured according to ISO 1183-187 in the range 820 to 900 kg/m$^3$ and/or
(b) a melt flow rate $MFR_2$ (190° C.) measured according to ISO 1133 in the range of 3.0 to 15.0 g/10 min.

12. The composition of claim 11, wherein the mineral filler (F) is talc.

13. The composition according to claim 1, wherein
(a) neither the total composition nor its individual components are visbroken and/or
(b) the heterophasic polypropylene (H-PP1), the heterophasic polypropylene (H-PP2), and the plastomer (P) are the only polymer components within the composition.

14. The composition according to claim 1, wherein the composition comprises:
(a) 20 to 40 wt.-% of the heterophasic polypropylene (H-PP1),
(b) 18 to 38 wt.-% of the heterophasic polypropylene (H-PP2),
(c) 12 to 30 wt.-% of the plastomer (P), and
(d) 15 to 30 wt.-% of the mineral filler (F).

15. An automotive article comprising a composition according to claim 1.

16. A process for the preparation of the composition according to claim 1 comprising the steps of adding the heterophasic polypropylene (H-PP1), the heterophasic polypropylene (H-PP2), the plastomer (P), and the mineral filler (F) to an extruder and extruding the same to obtain said composition.

17. A process for the manufacture of an automotive article comprising the step of molding the composition of claim 1.

* * * * *